R. P. Buttles,
Auger.
No. 92,261.  Patented July 6, 1869.
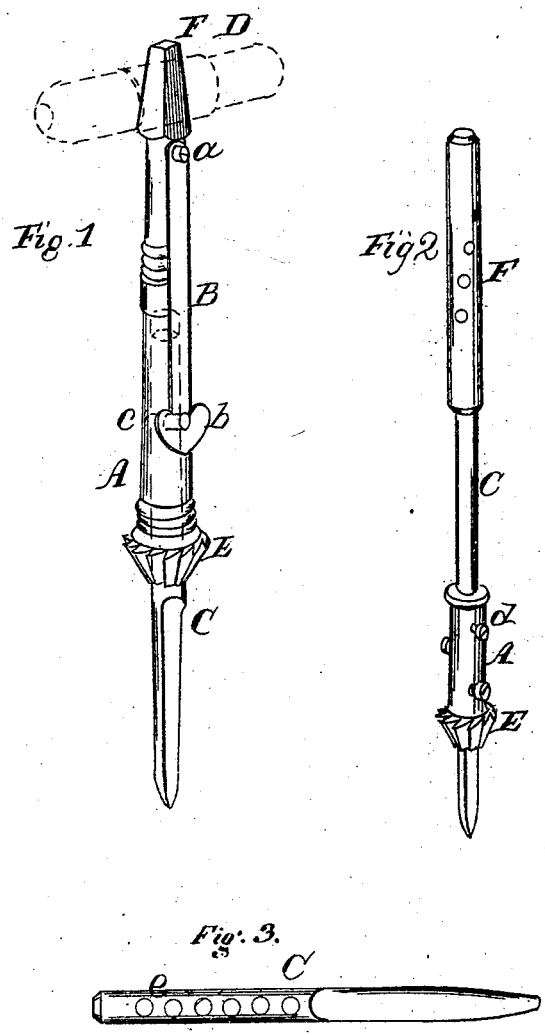
Witnesses.
P. T. Dodge.
L. Hailer.
Inventor,
R. P. Buttles
by Dodge & Munn
his attys

United States Patent Office.

R. P. BUTTLES, OF MANSFIELD, PENNSYLVANIA.

Letters Patent No. 92,261, dated July 6, 1869.

IMPROVEMENT IN COUNTERSINK.

The Schedule referred to in these Letters Patent and making part of the same.

*To all whom it may concern:*

Be it known that I, R. P. BUTTLES, of Mansfield, in the county of Tioga, and State of Pennsylvania, have invented certain new and useful Improvements in a Boring-Tool and Countersink Combined; and I do hereby declare that the following is a full, clear, and exact description thereof, reference being had to the accompanying drawings, making part of this specification, and to the letters of reference marked thereon.

Like letters indicate like parts, wherever they occur.

To enable others skilled in the art to construct and use my invention, I will proceed to describe it.

My invention relates to countersinks; and consists in constructing them in a novel manner, so that a tool may be adjusted to them, by means of a spring and catch, or so that they may be adjusted on the tool, the object being in both instances to allow the tool to enter the wood to any desired distance, when the countersink will operate on the outer end of the hole.

In the drawings—

Figure 1 is a perspective view of my countersink, with tool adjusted to it;

Figure 2 is a perspective view of my countersink, adjusted on the tool; and

Figure 3 is a view of a tool, with holes in its shanks.

The object of my invention is to provide a countersink that may be connected with a tool, so as to permit the latter to penetrate the wood to any desired distance, and then countersink the upper end of the bore, and that may be used either with or without a bit-stock.

I make a metallic stem or shank, A, with a head, F, to receive an ordinary T-handle, D, or for connection with a bit-stock, and provided at its lower end with a countersink-burr, E.

This stem A, from the point of the burr E to the distance of two or three inches, I chamber, as shown by the dotted lines in fig. 1, for the insertion of tool C, and from the side and into this chamber I make a hole, c.

Just below the head F, on the side of the stem of the countersink, I attach, by means of a screw, a, or other convenient device, a spring, B, long enough to extend to the hole c; and to its loose end, immediately over the hole c, I attach a pin, b, so as readily to enter the hole c, as shown in fig. 1.

The shank of the tool C, I provide with a series of holes, e, as shown in fig. 3, so that when this shank is inserted in the chamber of the stem of the countersink it may be adjusted and fastened at any desired point, by means of the pin b, attached to the spring B, as shown in fig. 1.

The countersink, instead of being made, as shown in fig. 1, so that the tool may be adjusted in it, I also make as shown in fig. 2, so that it may be adjusted on the tool.

To accomplish this, I chamber the stem of the countersink through and through, and provide it with set-screws, d, for adjusting it on a tool.

This is done by passing the tool through it and then fastening it at any desired point.

The tool may have a shank, as shown in fig. 2, so that it may be attached to a chambered countersink, as shown in fig. 1, or have a countersink attached to it, as shown in fig. 2.

It is obvious that a countersink might be constructed on the end of the bit-stock, and then on the side of the bit-stock be attached a spring, with a pin to pass through an opening, and enter any one of a series of holes in the shank of the tool, and in this manner, that the countersink be adjusted so as to limit the penetration of the tool.

By the use of a tool constructed in this way, the countersink can be readily adjusted, so that by a single operation of the tool, holes suitable for screws of any particular length may be bored and countersunk, ready for the insertion of the screw.

It may be used with a bit-stock, or have a handle attached to it, and may be attached for service to many different kinds of tools, such as screw-drivers, gimlets, rimmers, bits, small augers, drills, and similar tools.

I am aware that countersinks have been made with a single cutting lip, and arranged to be attached to a bit or boring-tool; but such devices have failed to operate satisfactorily, for the reasons:

First, that a single lip is apt to "eat in," especially if the wood be cross-grained, or the hole be bored at an angle, both of which often occur, and in which cases the holes for the head of the screw will be left jagged and irregular, or the wood be split out on one side; and Second, because as these instruments have been made, it is impossible or difficult to so attach them to the bit as to make the cutting-lip stand always at the same or desired angle.

By means of my burr-cutter and tubular stem these difficulties are entirely obviated, and a very perfect tool furnished.

Having thus described my invention,

What I claim, is—

A countersink, having a tubular stem, A, with the burr E formed on its lower end, and arranged to be used in connection with a bit or boring-tool, substantially as described.

R. P. BUTTLES.

Witnesses:
F. W. CLARK,
A. J. WEBSTER.